(12) United States Patent
Zimmer et al.

(10) Patent No.: US 7,673,126 B2
(45) Date of Patent: Mar. 2, 2010

(54) METHODS AND APPARATUS TO SELF-INITIALIZE A PROCESSOR

(75) Inventors: Vincent J. Zimmer, Federal Way, WA (US); Michael A. Rothman, Puyallup, WA (US); Mark S. Doran, Olympia, WA (US)

(73) Assignee: Intel Corporation, Santa Clara, CA (US)

(*) Notice: Subject to any disclaimer, the term of this patent is extended or adjusted under 35 U.S.C. 154(b) by 644 days.

(21) Appl. No.: 11/533,243

(22) Filed: Sep. 19, 2006

(65) Prior Publication Data
US 2008/0072027 A1 Mar. 20, 2008

(51) Int. Cl.
*G06F 9/24* (2006.01)
*G06F 9/00* (2006.01)
*G06F 9/455* (2006.01)
(52) U.S. Cl. .................. 713/1; 713/2; 703/27
(58) Field of Classification Search ........... 713/1
See application file for complete search history.

(56) References Cited

U.S. PATENT DOCUMENTS

| | | | |
|---|---|---|---|
| 4,315,310 A * | 2/1982 | Bayliss et al. | 710/3 |
| 4,527,268 A * | 7/1985 | Dublet | 370/437 |
| 6,184,904 B1 * | 2/2001 | Trummer et al. | 345/520 |
| 6,986,035 B2 | 1/2006 | Stevens, Jr. et al. | |
| 7,103,529 B2 * | 9/2006 | Zimmer | 703/27 |
| 7,174,447 B2 * | 2/2007 | Zimmer et al. | 713/1 |
| 2004/0098575 A1 | 5/2004 | Datta et al. | |

FOREIGN PATENT DOCUMENTS

JP 06222943 A * 8/1994

OTHER PUBLICATIONS

Intel® Itanium® 2 Processor, Specification Updated, Mar. 2005, 70 pages.
Intel® Chipset 4 GB System Memory Support White Paper, Feb. 2005, Revision 1.0, 19 pages.
Intel® IA-64 Architecture Software Developer's Manual, Specification Update, Mar. 2001, 88 pages.
Unified Extensible Firmware Interface Specification, Version 2.0, Jan. 31, 2006, 1437 pages.

* cited by examiner

*Primary Examiner*—Suresh K Suryawanshi
(74) *Attorney, Agent, or Firm*—Hanley, Flight & Zimmerman, LLC (57) ABSTRACT

Methods and apparatus are disclosed to self-initialize a processor. An example method disclosed herein detects a processor reset, receives initialization instructions from a core zone, establishes a core zone boundary, executes received initialization instructions, and publishes a data structure, the data structure comprising state information. Other embodiments are described and claimed.

28 Claims, 5 Drawing Sheets

METHODS AND APPARATUS TO SELF-INITIALIZE A PROCESSOR

FIELD OF THE DISCLOSURE

This disclosure relates generally to computer system boot processes, and, more particularly, to methods and apparatus to initialize a processor.

BACKGROUND

Computing devices, personal computers, workstations, and servers (hereinafter "computer" or "computers") typically include a basic input and output system (BIOS) as an interface between computer hardware (e.g., a processor, chipsets, memory, etc.) and an operating system (OS). The BIOS includes firmware and/or software code to initialize and enable low-level hardware services of the computer, such as basic keyboard, video, disk drive, input/output (I/O) port (s), and chipset drivers (e.g., memory controllers) associated with a computer motherboard.

Real mode is a central processing unit (CPU) operating mode that BIOS developers and manufacturers rely upon when initializing a computer. The real mode of CPU operation uses a segment register and an offset register, which are combined to form a linear address. Despite most CPUs having registers larger than 16-bits, such CPUs must begin early execution procedures in real mode based on, in part, backwards compatibility requirements and reliance upon legacy 16-bit real mode assembly language having only a very small region of code space for execution. Accordingly, third parties, such as computer platform manufacturers and operating system manufacturers, for example, accommodate such limitations by developing real mode assembly code for disk, video, and keyboard interrupts (Interrupts $13h$, $10h$, and $16h$, respectively). These boot limitations, which include limited memory storage, retard feature enhancement for modern-day computer platforms.

More recent non-legacy CPUs, such as 64-bit processors, include a greater amount of initialization complexity and features. However, processors in real mode allow no more than 1 MB of addressable memory. Such complexity and features are significantly hindered by the inability to take advantage of the CPU's full register width, thus severely limiting execution code space. Accordingly, a relatively large amount of handcrafted assembly language must be developed to employ real mode addressing schemes regardless of the CPU's true register width. Furthermore, real mode does not allow memory protection and may permit direct software access to BIOS routines and peripheral hardware.

Coping with real mode limitations is not limited to BIOS manufacturers. For example, effort must be applied by CPU manufacturers, chipset manufacturers, and computer platform original equipment manufacturers (OEMs) to understand CPU specific initialization details, and write corresponding drivers to support initialization processes during a typical BIOS hand-off from real mode to a protected mode, long mode, or other mode. Accordingly, the CPU manufacturers must invest significant amounts of time and resources developing public architecture documents, interface documents, whitepapers, and other instructional materials so that third party consumers and developers can write software to accommodate the hand-off between real mode and long mode. For example, OEMs typically write 16-bit real mode code that is to be executed at the reset vector. Today, all of the hardware initialization, both for the CPU and the chipset, needs to be described to the original design manufacturer (ODM) and OEM in significant detail so that such OEMs can create their own version(s) of startup BIOS/firmware code. In the event that the CPU manufacturer makes changes to its product design, or develops a new product line, additional low-level operational disclosures (e.g., user-manuals, system documents, whitepapers, etc.) must be provided from the CPU manufacturer to the various vendors that use the CPU so that such vendors may develop compatible device driver code.

DETAILED DESCRIPTION

Many processors (e.g., central processing units (CPUs)) in operation today hand-off control to original equipment manufacturer (OEM) applications and/or systems, and/or BIOS/firmware in a real mode of operation. As will be readily appreciated by those having ordinary skill in the art, real mode includes a register addressing scheme that calculates a linear address (for instructions) with, for example, a 16-bit code segment register and a 16-bit instruction pointer register. However, the real mode addressing scheme may not address more than one megabyte of memory, which is typically insufficient for more recent non-legacy CPUs.

OEM applications and/or systems may include dedicated chipsets, firmware, and/or software applications stored in memory. Additionally, the typical BIOS procedures, when finished, also turn control over to the operating system (OS) while the CPU is still in real mode. Such a real mode hand-off from the BIOS to the OS requires that the OS manufacturers develop specific protected mode drivers for each piece of hardware it implements and/or initializes because of several real mode limitations. Real mode limitations include, but are not limited to, modern OS's do not run in real mode, real mode operation does not allow paging, memory protection, or multitasking, and real mode exposes direct software access to BIOS routines and peripheral hardware. In view of the increasing complexity of CPUs and OSs in modern computer platforms, the legacy real mode, which dates back to the original IBM personal computers, fails to accommodate feature rich services in an efficient manner. In particular, real mode includes 20-bit segmented memory address space. Thus, no more than 1 MB ($2^{20}$) of memory can be addressed in real mode. Additionally, such memory space is not protected and, as described above, may allow direct access to BIOS routines and any peripheral hardware, thereby aggravating security concerns for the platform.

As described herein, initializing a processor and/or a CPU without real mode constraints minimizes and/or eliminates the need for the BIOS designers/manufacturers, the OS manufacturers, and/or the OEMs to develop low-level 16-bit code. Furthermore, the burden of technical publication by the CPU manufacturer is minimized when real mode support efforts are eliminated. As such, a processor operating in long mode offers full advantage of much larger registers and corresponding addressable memory to facilitate a rich CPU feature-set.

Processors may operate in long mode, which, unlike real mode, accommodates 64-bit applications, 64-bit OSs, and includes 64-bit instructions and registers. Starting a processor in long mode permits, in part, significantly more addressable memory to accommodate platforms having additional complexity and/or features. Additionally, avoiding any requirement to boot in a legacy boot mode, such as real mode, eliminates or minimizes OEM requirements to design legacy drivers pursuant to processor-specific legacy nuances that are, for example, maintained for backwards compatibility purposes.

Booting the processor without legacy constraints also allows the processor manufacturer greater control over proprietary operations. For example, CPUs typically invoke built-in self test (BIST) firmware to monitor and/or abate CPU startup issues. While such BIST processes are typically of no concern to OEMs, such processes are subject to review, analysis, and reverse engineering by virtue of the literature proffered by the processor manufacturer that is provided to assist OEM application development efforts. Additionally, handing-off the processor to the BIOS, OS, and/or other firmware in the non-legacy mode (e.g., long mode, protected mode, etc.) may be accomplished via code stored on the processor, as part of the processor chipset, and/or code stored on read only memory (ROM), all of which are not necessarily exposed to third parties (e.g., OEMs, end-users, etc.). Accordingly, processor manufacturers may protect their intellectual property and evolve processor designs over time without being inundated by OEM support efforts. Instead, the processor manufacturer can hand-off CPU access to the OEMs in an initialized state without any need for external software and/or firmware (e.g., BIOS routines).

Figure 1:
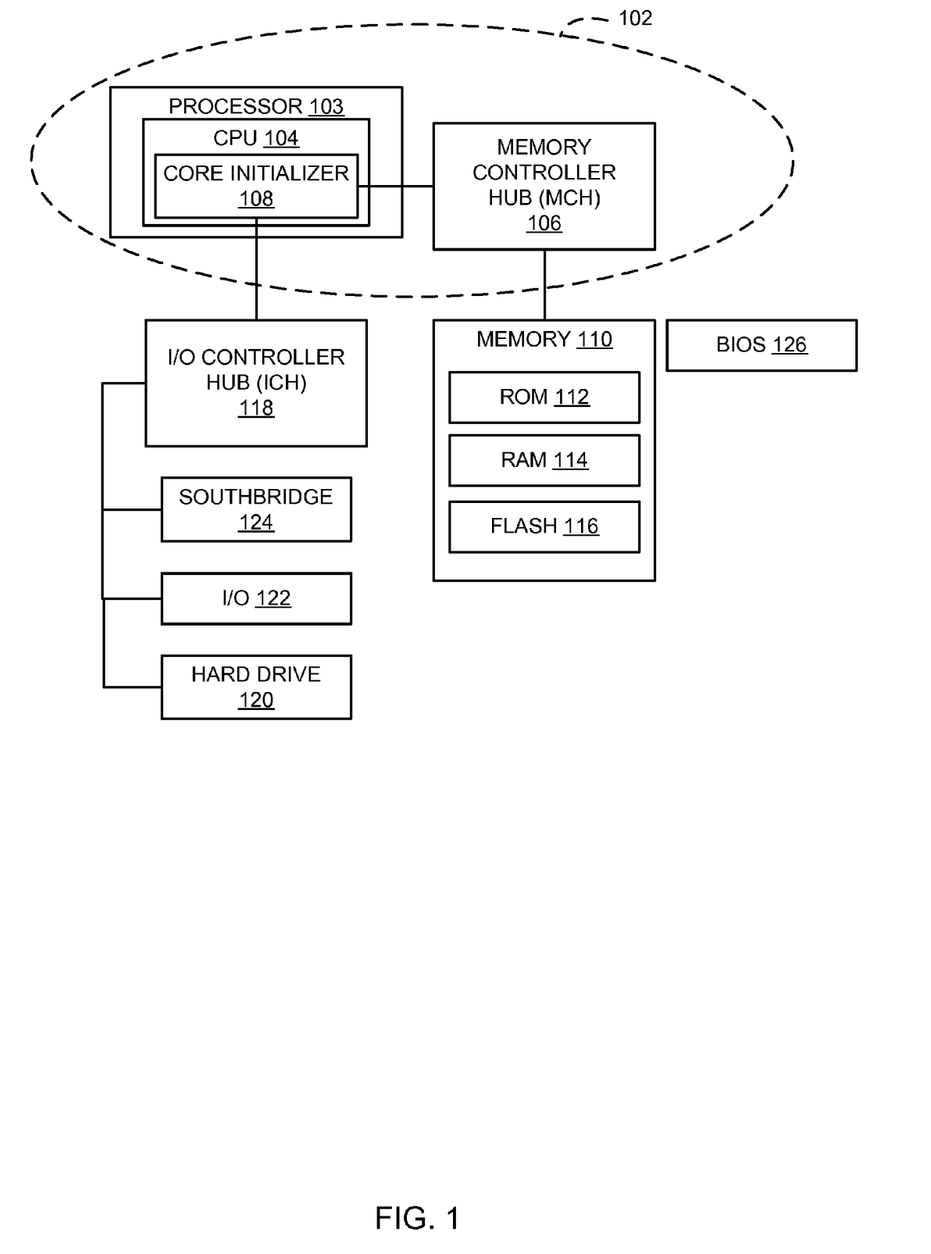
FIG. 1 is a block diagram showing an example computer platform having a core initializer and an example core zone of initialization.

FIG. 1 is a diagram of an example computer platform 100 to self-initialize a processor. Generally speaking, the example computer platform 100 of FIG. 1 allows self-initialization of a core zone 102 prior to execution of non-processor manufacturer related firmware and/or software. Non-processor manufacturer related firmware and/or software includes, but is not limited to, firmware and software associated with platform 100 peripherals, such as memory controllers, I/O controllers, disk drives, audio devices, video devices, and/or various network devices. For example, while various BIOS routines and/or non-processor originated software participate in the processor initialization process for a typical computer platform, the core zone 102 self-initializes processor components therein independently of BIOS, firmware, software, and/or other OEM applications that may eventually request operational resources from a processor 103 and/or a corresponding processor chipset. When initialization of the core zone 102 is complete, the components of the core zone 102 are made available to the rest of the platform 100.

In the illustrated example, the core zone 102 includes one or more CPUs 104, a memory controller hub (MCH) 106, and a core initializer 108, which is implemented on the CPU 104. The CPUs 104 may include, but are not limited to, one or more Intel® microprocessors from the Pentium® family, the Itanium® family, the XScale® family, the Core™ 2, the Xeon®, or the Centrino™ family.

The MCH 106 may include a memory controller that provides an interface between the CPU 104 and a memory 110, in which the memory 110 may include ROM 112, various types of random-access memory (RAM) 114, and/or flash memory 116. RAM 114 may be implemented by dynamic random access memory (DRAM), Synchronous DRAM (SDRAM), and/or any other type of memory device. The MCH 106 also balances platform resources and enables concurrent process for either single or multiple CPU configurations. CPU manufacturers may also design, manufacture, and integrate the MCH 106 very closely with their CPUs, or the CPU manufacturers may not provide an MCH for one or more of their CPU products. In the latter case, the MCH 106 may not reside within the core zone 102.

The core initializer 108 is implemented by the CPU 104 executing firmware and/or software instructions. As discussed in further detail below, the core initialzer 108 establishes the core zone 102 boundary of platform 100 components to be self initialzed. The core initializer 108 may establish a boundary of one or more CPUs 104, the processor 103, and/or may include additional platform 100 components, such as the MCH 106.

The illustrated example platform 100 of FIG. 1 also includes an input/output controller hub (ICH) 118. The ICH 118 forms a direct connection between the CPU 104 and one or more hard disk drives 120, various I/O devices 122 (e.g., universal serial bus (USB) ports, serial ports, keyboard, mouse, and/or video), and/or a southbridge 124. The hard disk drives 120 may be any type of mass storage device, including floppy disk drives, hard drive disks, compact disk drives, and digital versatile disk (DVD) drives. The southbridge 124 may provide functionality for various platform 100 busses (e.g., a Peripheral Component Interconnect (PCI) bus, an Industry Standard Architecture (ISA) bus, a System Management Bus (SMB), low pin count (LPC) bus, etc.), various controllers (e.g., a direct memory access (DMA) controller, an interrupt controller, a real-time clock, and/or an advanced configuration and power interface (ACPI). The southbridge 124 may also include support for Ethernet, RAID, various audio codecs, and/or FireWire®.

In the illustrated example, the platform 100 also includes a basic input and output system (BIOS) 126 to initialize the platform. As discussed above, the BIOS 126 is typically the first code that executes on a computer system after a CPU reset. Generally speaking, a typical computer system CPU may be ready to execute some code immediately after the CPU reset, but relies upon the BIOS 126 to initialize other facets of the computer system. The typical CPU begins execution at a memory location/address hard-coded by the CPU or chipset. Such memory locations may be chipset and/or CPU dependent or compatible with industry standard locations. For example, the hard-coded memory location/vector may be near the end of non-volatile memory and then "jump" to an alternate memory location for further instructions. Such further instructions may include various binaries, software programs, and/or executables to, for example, perform power-on self test (POST) procedures on the memory, hard-drive(s), network card, and/or various I/O devices 122.

As discussed in detail below, the example platform 100 includes the core initializer 108 to, in part, initialize the CPU 104 and the MCH 106 prior to BIOS 126 execution. Additionally, the core initializer 108 initializes the CPU 104 and the MCH 106 prior to any OEM software and/or other non-CPU related firmware can execute, thereby allowing the CPU manufacturer to hand-off CPU resources to the platform in any desired CPU state (i.e., not limited to starting the CPU 104 in real mode). Accordingly, the core initializer 108 eliminates and/or minimizes the burden upon OEMs to write CPU specific low-level code (e.g., 16-bit real mode code) in an effort to comply with backwards compatibility requirements of the general computer system industry.

Figure 2:
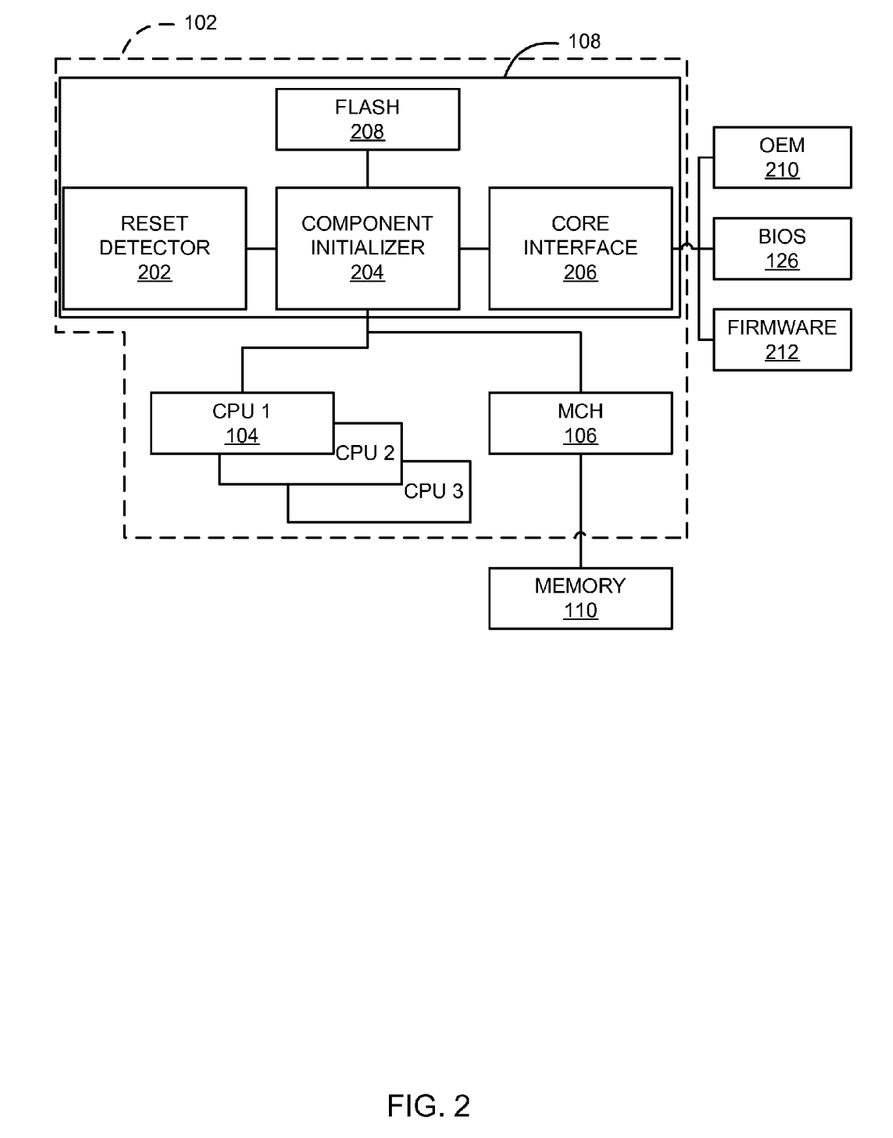
FIG. 2 is a block diagram showing additional detail of the example core initializer of the example computer platform in FIG. 1.

FIG. 2 is a diagram of additional detail of the example core zone 102 and the example core initializer 108 of FIG. 1. In the illustrated example, the core initializer 108 includes a reset detector 202, a component initializer 204, a core interface 206, and a flash memory 208. The core zone 102 is illustrated in FIG. 2 within a dashed-line border and includes the example CPU 104 and example MCH 106 of FIG. 1. Persons of ordinary skill in the art will appreciate that the example platform 100 may include multiple processors, as shown in FIG. 2. Platform 100 components outside the core zone 102 include, but are not limited to, the memory 110, the BIOS 126, OEM software 210, and other firmware 212.

Generally speaking, the reset detector 202 monitors for a platform 100 power-up condition and/or reset, such as the end-user pressing a power button or reset button of the platform 100. Upon detecting such a condition, the reset detector invokes the component initializer 204, which extracts initialization code from the flash memory 208. As described above, the initialization code of the core initializer 108 may include, but is not limited to CPU firmware, CPU power-on-self-test (POST) procedures, and/or BIST firmware. While the example initialization code is shown within the flash memory 208, persons of ordinary skill in the art will appreciate that the initialization code may reside in a memory location external to the core initializer 108, such as on a flash memory of a motherboard, ROM chip(s) of a chipset, and/or memory located on the CPU 104.

In the illustrated example, the component initializer 204 is operatively connected to the CPU(s) 104 and MCH 106 and executes initialization code from the flash memory 208. For example, the component initializer 204 initializes the chipset (s) associated with the MCH 106. When the MCH 106 is initialized, the MCH 106 may proceed to performing initialization of the memory 110 so that the BIOS 126 and/or the OS do not need to perform any memory validation procedures during and/or after the CPU hand-off to the OS.

Upon completion of CPU 104 and/or MCH 106 initialization, the core interface 206 receives a notification signal from the component initializer 204 that the platform 100 may utilize the services of the CPU 104 and/or the MCH 106. In the illustrated example of FIG. 2, the core interface also prepares various data structures that contain detailed information about the status of components (e.g., state information) within the core zone 102. Accordingly, any facilities external to the core zone 102, such as OEM software/applications 210, BIOS 126, and/or various firmware applications 212, may query the core interface 206 to determine whether the core zone 102 components (e.g., the CPU 104 and/or MCH 106) are ready for use, as well as determine various operational capabilities of those facilities. For example, a data structure of the core interface 206 may identify to a requestor (e.g., BIOS 126, an OEM application 210, a firmware application 212, etc.) how much platform memory 110 is available (e.g., 512 MB) and what various types of memory 110 are available (e.g., Double Data Rate-Synchronous DRAM).

Figure 3:
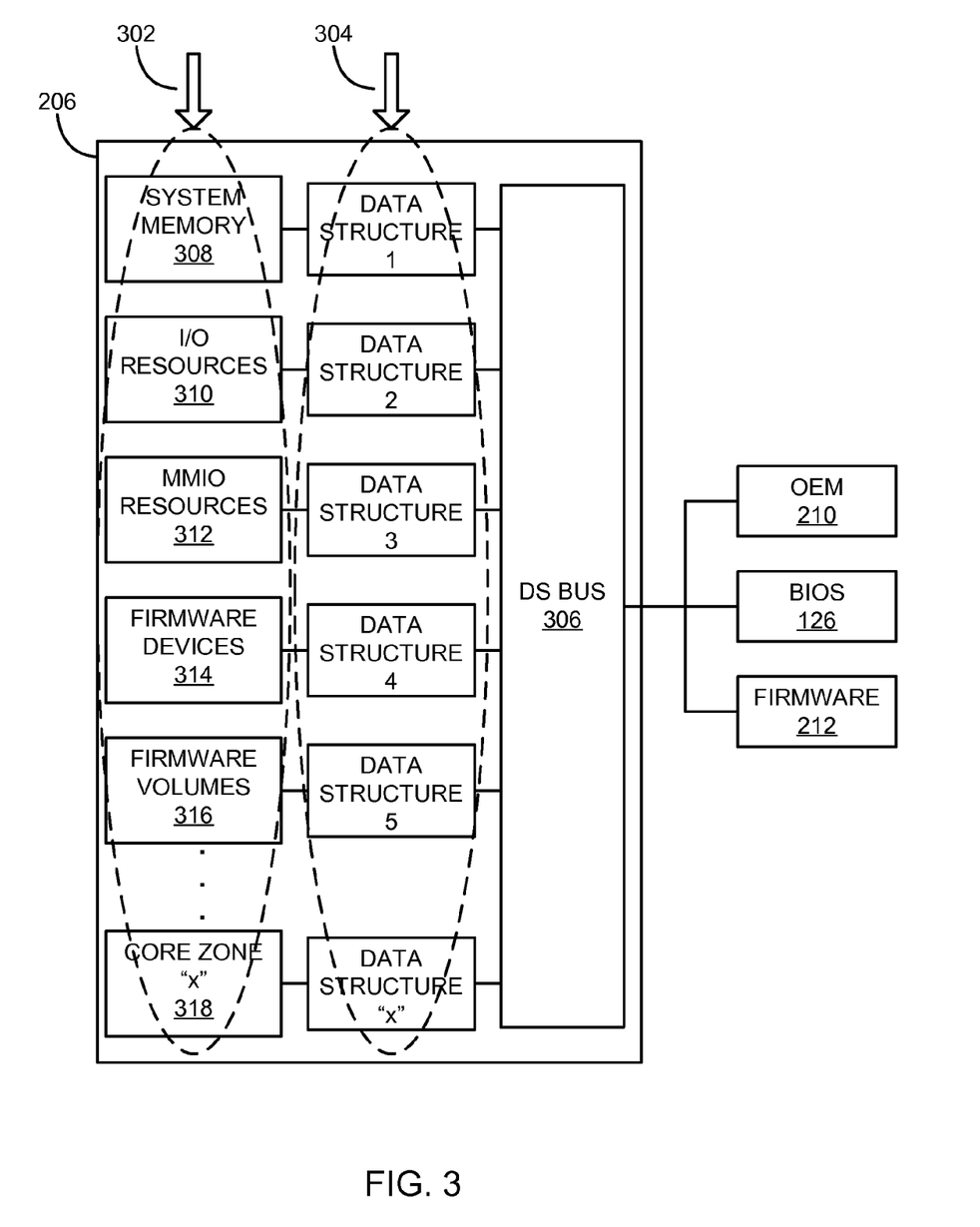
FIG. 3 is a block diagram showing additional detail of a core interface of the example core initializer of FIGS. 1 and 2.

FIG. 3 is a diagram of additional detail of the example core interface 206 of FIG. 2. In the illustrated example, the core interface 206 includes core zone parameters 302, data structures 304, and a data structure bus 306. The core zone parameters 302 may include, but are not limited to, a device list of system memory parameters 308, I/O resources parameters 310, memory-mapped I/O (MMIO) resource parameters 312, firmware device parameters 314, firmware volume parameters 316, and/or any other parameters 318 of a platform 100 core zone 102. Each core zone parameter 302 includes a corresponding data structure 304 that is operatively connected to the data structure bus 306. The requester (e.g., BIOS 126, an OEM application 210, a firmware application 212, etc.) may make a query to the core interface 206 to extract details from available core zone parameters 302 via the corresponding data structures 304.

Without limitation, the core interface 206 may employ hand-off blocks (HOBs) developed by Intel®, which are binary structures that may pass state information from the core zone 102 components to an external interface via a "C-style" data types and structures. Accordingly, requestors have a rich set of commands to use when determining core zone 102 content, status, and/or capabilities. Furthermore, the manufacturer of such core zone 102 components (e.g., CPUs, chipset(s), MCH, ICH, etc.) may dictate what kind of information is available to the requesters, thereby protecting potentially proprietary details of the component(s). The HOBs also allow any OEM 210 to perform queries to determine state information without any need for custom code development typically associated with legacy real mode constraints.

Having described the architecture of one example system that may be used to self-initialize a processor, various processes are described. Although the following discloses example processes, it should be noted that these processes may be implemented in any suitable manner. For example, the processes may be implemented using, among other components, software, or firmware executed on hardware. However, this is merely one example and it is contemplated that any form of logic may be used to implement the systems or subsystems disclosed herein. Logic may include, for example, implementations that are made exclusively in dedicated hardware (e.g., circuits, transistors, logic gates, hard-coded processors, programmable array logic (PAL), application-specific integrated circuits (ASICs), etc.) exclusively in software, exclusively in firmware, or some combination of hardware, firmware, and/or software. Additionally, some portions of the process may be carried out manually. Furthermore, while each of the processes described herein is shown in a particular order, persons having ordinary skill in the art will readily recognize that such an ordering is merely one example and numerous other orders exist. Accordingly, while the following describes example processes, persons of ordinary skill in the art will readily appreciate that the examples are not the only way to implement such processes.

Figures 4, 5:
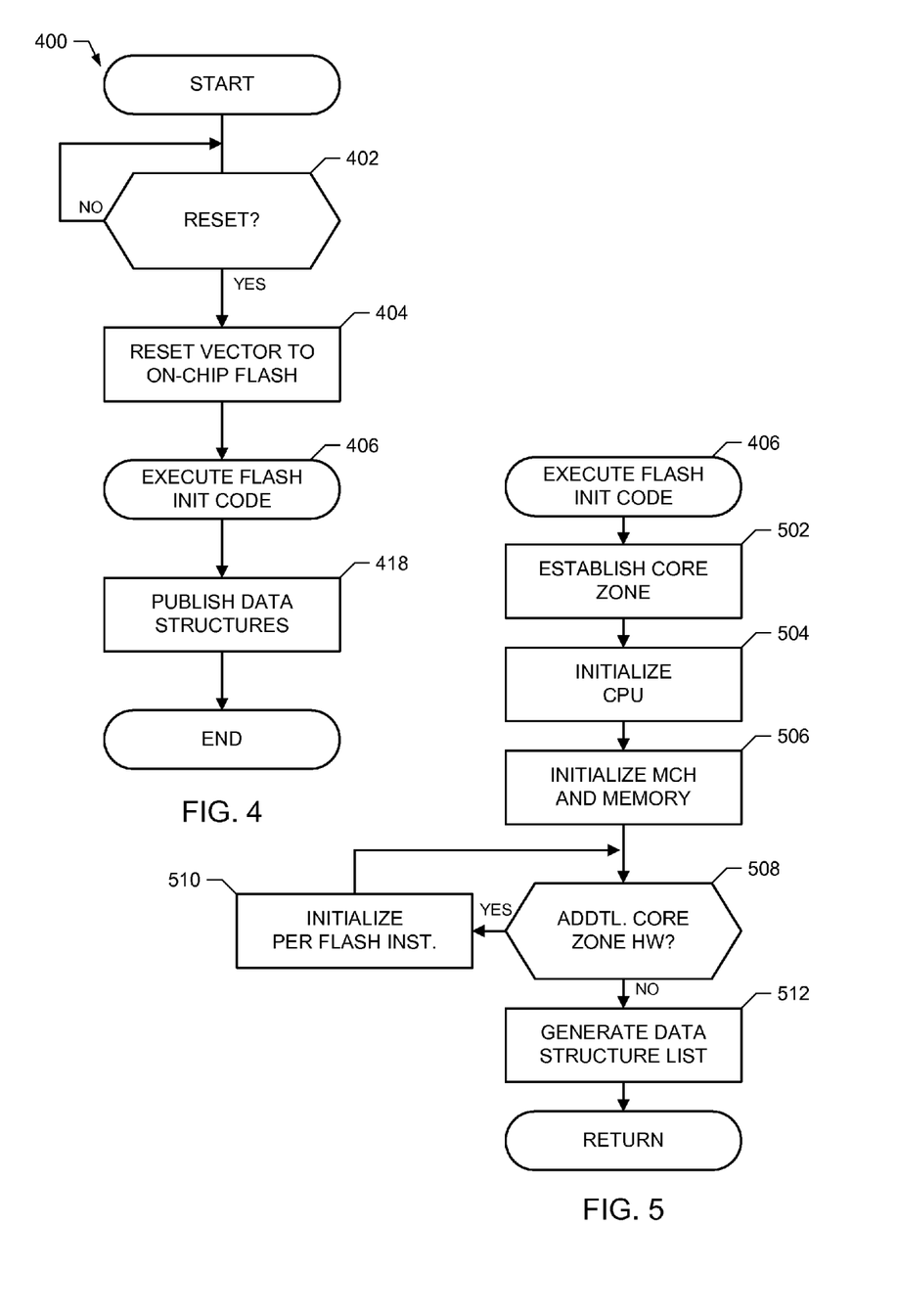
FIGS. 4 and 5 are flow diagrams of example processes that may be performed by the example core initializer of FIGS. 1-3.

FIG. 4 is a flowchart of an example process 400 to self-initialize a processor. The platform 100, such as a computer platform, is powered-on from an inactive state and/or is reset to cause a CPU reset that is detected by the reset detector 202 (block 402). In the illustrated example, the CPU begins execution from a reset vector, which "jumps" to the flash memory 208 (block 404). Initialization instructions stored in the flash memory 208 are executed by the core initializer 204 to begin preparing the core zone 102 components from their initially powered-down state (block 406).

FIG. 5 is a flowchart of additional detail of the example process to initialize core zone 102 components (block 406). In the illustrated example, the component initializer 204 receives instructions from the core flash memory 208 to determine a boundary for the core zone 102 (block 502). For example, some platform configurations may define a core zone limited to one or more CPUs, while other example platforms may include one or more CPUs plus various controllers, such as the example MCH 106, the ICH 118, and/or various amounts of memory. An authorized user may edit the instructions of the flash memory 208 to expand or restrict the core zone 102 to any boundary.

After the core zone 102 is established (block 502), the component initializer 204 performs various initialization instructions on components within the core zone 102 boundary, such as the CPU(s) 104 (block 504). As discussed above, the initialization instructions may include, but are not limited to BIST procedures and/or interconnect built-in self test (I-BIST) procedures. Generally speaking, I-BIST procedures test chip-to-chip interconnects and high-speed bus designs. Additionally, the I-BIST procedures may validate high-speed busses, such as PCI Express and/or fully buffered DIMM (FBD).

As discussed above, the flash memory 208 includes initialization instructions for all components of the core zone 102 that require initialization, including initialization instructions for the MCH 106 (block 506). Persons of ordinary skill in the art will appreciate that the core zone 102 for a platform may differ significantly from one manufacturer to the next. For example, some manufacturers may include within the core zone an ICH, various 10 chipsets, and/or various southbridge chipsets. In the illustrated example of FIG. 5, the component initializer 204 initializes the MCH 106 and then proceeds to initialize the memory 110 (block 506) even though such memory 110 is external to the core zone 102. As a result, the OS, OEM application(s) 210, BIOS 126, and/or various firmware applications are not burdened with memory initialization and/or a low level understanding of a memory controller of the MCH 106.

Upon completion of MCH and memory initialization (block 506), the component initializer 204 determines whether the core zone 102 contains additional components that require initialization (block 508). If so, then the component initializer 204 retrieves corresponding initialization instructions from the flash memory 208 and initializes the components per the retrieved instructions (block 510). On the other hand, if all components of the core zone 102 have been initialzed (block 508), then the core interface 206 generates a data structure list containing approved state information for requesters (block 512). Approved state information may include only such data that the CPU manufacturer chooses to release to third parties.

Returning to FIG. 4, the core interface 206 generates and publishes data structures 304 that correspond to various core zone parameters 302 of the data structure list of approved state information (block 418). Requestors, such as an OS, BIOS 126, OEM applications 210, and/or various third party firmware applications 212 may access the published data structures 304 to learn what resources of the core zone 102 are available, and various details about such resources.

Figure 6:
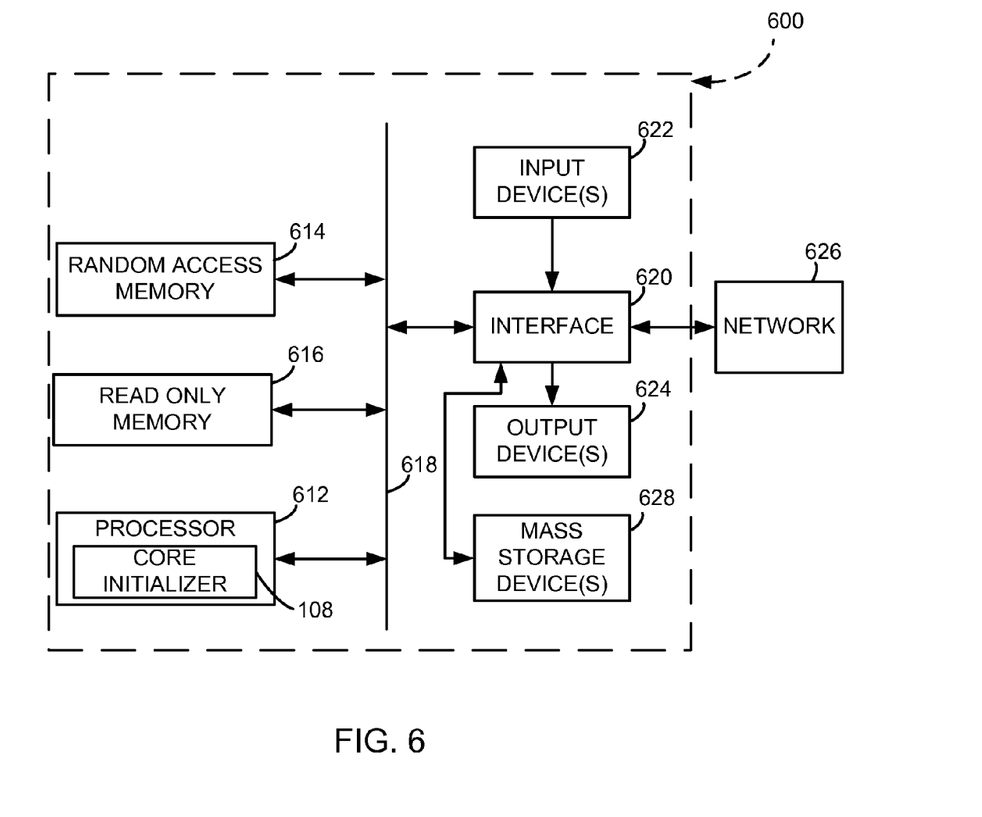
FIG. 6 is a schematic illustration of an example processing system that may be used to implement the methods and apparatus described herein.

FIG. 6 is a block diagram of an example computer 600 capable of implementing the apparatus and methods disclosed herein. The computer 600 can be, for example, a server, a personal computer, a personal digital assistant ("PDA"), an Internet appliance, a DVD player, a CD player, a digital video recorder, a personal video recorder, a set top box, or any other type of computing device.

The system 600 of the instant example includes a processor 612. For example, the processor 612 can be implemented by one or more Intel® microprocessors from the Pentium® family, the Itanium® family, the XScale® family, or the Centrino™ family. Of course, other processors from other families are also appropriate.

The processor 612 includes the core initializer 108 and is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is typically controlled by a memory controller (not shown) in a conventional manner.

The computer 600 also includes a conventional interface circuit 620. The interface circuit 620 may be implemented by any type of well-known interface standard, such as an Ethernet interface, a universal serial bus (USB), and/or a third generation input/output (3GIO) interface.

One or more input devices 622 are connected to the interface circuit 620. The input device(s) 622 permit a user to enter data and commands into the processor 612. The input device(s) can be implemented by, for example, a keyboard, a mouse, a touch screen, a track-pad, a trackball, isopoint and/or a voice recognition system.

One or more output devices 624 are also connected to the interface circuit 620. The output devices 624 can be implemented, for example, by display devices (e.g., a liquid crystal display, a cathode ray tube display (CRT), a printer and/or speakers). Thus, the interface circuit 620 typically includes a graphics driver card.

The interface circuit 620 also includes a communication device such as a modem or network interface card to facilitate exchange of data with external computers via a network 626 (e.g., an Ethernet connection, a digital subscriber line (DSL), a telephone line, coaxial cable, a cellular telephone system, etc.).

The computer 600 also includes one or more mass storage devices 628 for storing software and data. Examples of such mass storage devices 628 include floppy disk drives, hard drive disks, compact disk drives and digital versatile disk (DVD) drives. The mass storage devices 628 may implement the memory 614.

As an alternative to implementing the methods and/or apparatus described herein in a system such as the device of FIG. 6, the methods and/or apparatus described herein may alternatively be embedded in a structure such as processor and/or an ASIC (application specific integrated circuit).

From the foregoing, persons of ordinary skill in the art will appreciate that the above disclosed methods and apparatus may be implemented in a static compiler, a managed run-time environment just-in-time compiler (JIT), and/or directly in the hardware of a microprocessor to achieve performance optimization in executing various programs.

Although certain apparatus constructed in accordance with the teachings of the invention have been described herein, the scope of coverage of this patent is not limited thereto. On the contrary, this patent covers every apparatus, method and article of manufacture fairly falling within the scope of the appended claims either literally or under the doctrine of equivalents.

What is claimed is:

1. A method of self-initializing a processor, the method comprising:
   detecting a processor reset;
   receiving initialization instructions from a core zone;
   establishing a core zone boundary;
   executing received initialization instructions; and
   publishing a data structure, the data structure comprising state information for use by a requestor of resources from the core zone.

2. A method as defined in claim 1, wherein detecting the processor reset comprises detecting at least one of a power-on state or a chipset reset signal.

3. A method as defined in claim 1, further comprising receiving initialization instructions from at least one of a processor memory, a flash memory, a read only memory (ROM), or a random access memory (RAM).

4. A method as defined in claim 3, wherein the at least one of the processor memory, the flash memory, the ROM, or the RAM resides within the core zone.

5. A method as defined in claim 4, wherein the initialization instructions prevent execution of at least one of software or firmware external to the core zone.

6. A method as defined in claim 1, wherein the initialization instructions execute on at least one device in the core zone.

7. A method as defined in claim 6, wherein the at least one device in the core zone comprises at least one of the processor, a memory controller, or an input/output (I/O) controller.

8. A method as defined in claim 1, further comprising handing-off the processor to at least one of an operating system (OS), a basic input/output system (BIOS) process, or an original equipment manufacturer (OEM) system.

9. A method as defined in claim 8, wherein the processor is handed-off in at least one of real mode, protected mode, or long mode.

10. A method as defined in claim 1, further comprising generating a device list corresponding to a plurality of devices in the core zone.

11. A method as defined in claim 10, further comprising generating the data structure for each one of the plurality of devices in the core zone.

12. An apparatus to self-initialize a processor, the apparatus comprising:
a core zone comprising at least one processor;
a core initializer to initialize the at least one processor in the core zone; and
a plurality of data structures to provide state information for the at least one processor in the core zone.

13. An apparatus as defined in claim 12, wherein the core zone comprises at least one of a memory controller, an input/output (I/O) controller, or at least one processor chipset.

14. An apparatus as defined in claim 12, wherein the core initializer comprises a reset detector to determine at least one of a computer platform power-up or a computer platform reset request.

15. An apparatus as defined in claim 12, wherein the core initializer comprises a core initializer and a memory, the core initializer to execute initialization instructions stored on the memory.

16. An apparatus as defined in claim 15, further comprising a platform memory external to the core zone, the core initializer initializing the platform memory.

17. An apparatus as defined in claim 12, wherein the core initializer comprises a core interface to provide state information to non-core zone entities.

18. An apparatus as defined in claim 17, wherein the non-core zone entities comprise at least one of a basic input and output system (BIOS), an original equipment manufacturer (OEM) application, or a firmware application.

19. An apparatus as defined in claim 17, wherein the core interface comprises a plurality of data structures, each one of the plurality of data structures comprising a plurality of core zone state information.

20. An article of manufacturing storing machine readable instructions which, when executed, cause a machine to:
detect a processor reset;
receive initialization instructions from a core zone;
establish a core zone boundary;
execute received initialization instructions; and
publish a data structure, the data structure comprising state information for use by a requestor of resources from the core zone.

21. An article of manufacture as defined in claim 20, wherein the machine readable instructions cause the machine to detect at least one of a power-on state or a chipset reset signal.

22. An article of manufacture as defined in claim 20, wherein the machine readable instructions cause the machine to receive initialization instructions from at least one of a processor memory, a flash memory, a read only memory (ROM), or a random access memory (RAM).

23. An article of manufacture as defined in claim 22, wherein the machine readable instructions cause the machine to prevent execution of at least one of software or firmware external to the core zone.

24. An article of manufacture as defined in claim 20, wherein the machine readable instructions cause the machine to execute the initialization instructions on at least one device in the core zone.

25. An article of manufacture as defined in claim 20, wherein the machine readable instructions cause the machine to hand-off the processor to at least one of an operating system (OS), a basic input and output system (BIOS) process, or an original equipment manufacturer (OEM) system.

26. An article of manufacture as defined in claim 25, wherein the machine readable instructions cause the machine to hand-off the processor in at least one of real mode, protected mode, or long mode.

27. An article of manufacture as defined in claim 20, wherein the machine readable instructions cause the machine to generate a device list corresponding to a plurality of devices in the core zone.

28. An article of manufacture as defined in claim 27, wherein the machine readable instructions cause the machine to generate a data structure for each one of the plurality of devices in the core zone.

* * * * *